Feb. 17, 1953  J. V. KIERULFF  2,628,742
MEASURING DEVICE FOR TOOTH PASTE TUBES
Filed Feb. 1, 1949
FIG. 1.
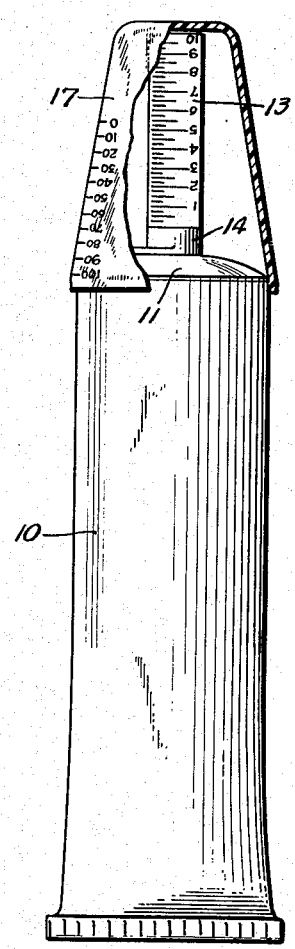
FIG. 2.
FIG. 3.
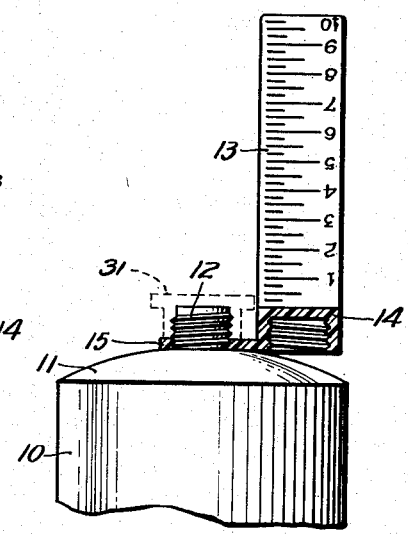
FIG. 4.
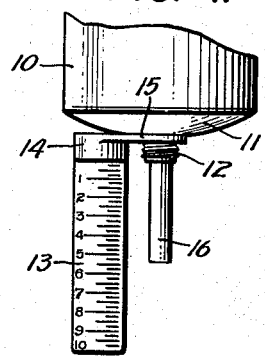
FIG. 5.
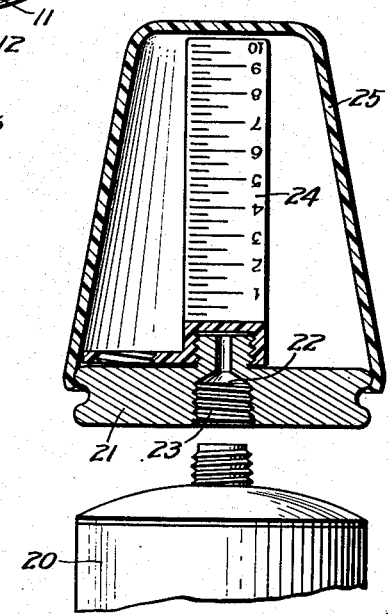
FIG. 6.
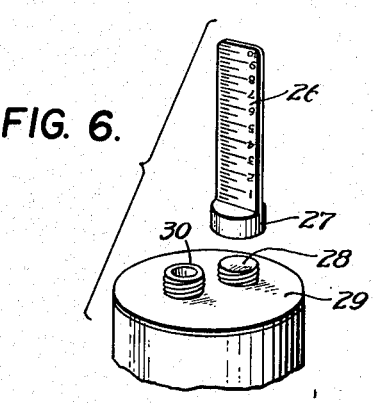
INVENTOR
JORGEN V. KIERULFF
BY
*Mitchum Bashert*
ATTORNEYS Patented Feb. 17, 1953

2,628,742

UNITED STATES PATENT OFFICE 2,628,742

MEASURING DEVICE FOR TOOTH PASTE TUBES

Jorgen Vibe Kierulff, Los Angeles, Calif.

Application February 1, 1949, Serial No. 73,920
In Sweden February 4, 1948

5 Claims. (Cl. 222—23)

My invention relates to means for accurately measuring specific quantities of a squeezable, viscous, paste-like material.

It is an object of the invention to provide an improved device of the character indicated.

It is another object to provide measuring means which may be applied to a container for squeezable material of the character indicated, near the outlet opening of said container, said means permitting the direct observation of the quantity of material squeezed out, without requiring a separate measuring operation.

It is a more specific object to provide an improved attachment for squeezable tubes for measuring the quantity of substance dispensed therefrom.

It is another specific object to meet the above objects with a device which may serve as a cap or closure member as well as a measuring instrument.

Other objects and various further features of the invention will be pointed out or will occur to those skilled in the art from a reading of the following specification in conjunction with the accompanying drawings. In said drawings, which show, for illustrative purposes only, preferred forms of the invention:

Fig. 1 is a front elevation, partly in section, showing a squeezable tube to which measuring means of the invention has been applied;

Fig. 2 is a perspective view of a part of the device of Fig. 1;

Fig. 3 is an enlarged fragmentary view, partly in section, of the device of Fig. 2 when mounted on the tube of Fig. 1, and in a position ready for measuring a dispensed quantity of material in the tube;

Fig. 4 is a view of the arrangement of Fig. 3 when material is being dispensed from the tube and showing that the specific dispensed quantity may be readily observed;

Fig. 5 is a sectional view of a modification of the arrangement of Fig. 1; and

Fig. 6 is a perspective view of a modification of the arrangement of Fig. 2.

Briefly stated, my invention contemplates an improved means for measuring specific quantities of a viscous jelly-like or paste-like material that may be squeezed or extruded from a dispensing tube or the like. The measuring means may include a projecting ruler or scale to be positioned adjacent the dispensing opening so that the extruded material may be observed directly alongside the markings of the scale. In one form to be described, the ruler or scale is formed on the top of a closure member or cap for the tube, and means are provided for mounting this closure member adjacent the dispensing opening. The attachment means may include an offset bracket to be threadedly engaged to the threaded nozzle of the tube, or a threaded stud may be provided on the tube itself so as to mount the ruler cap when removed from the nozzle. A protective cup may be removably held on the tube so as completely to cover the projecting ruler, and the cup may be inscribed with depth markings, to be used when it is desired to dispense quantities of material in excess of those observable on the ruler scale.

Referring to Figs. 1 to 4 of the drawings, my invention is shown in application to an attachment for a squeezable tube 10 having a dispensing end 11 with an externally threaded dispensing nozzle 12 thereon. In the covered or closed position of Fig. 1, a ruler scale member 13 of the invention closes off the dispensing nozzle 12. The ruler 13 may be formed integrally with a cap or closure portion 14, and, in the form shown, bracket means 15 on the cap 14 includes an offset threaded opening 16 to be threaded to the nozzle 12 in order to hold the ruler scale 13 in a measuring position. The ruler scale 13 may be inscribed with weight or volume units for the particular material to be dispensed.

It will be seen from Fig. 4 that, when the tube 10 has been uncovered and when the scale 13 has been mounted in a measuring position, the quantity of extruded material 16 may be readily observed directly alongside the ruler scale. The extruded material may then be cut off at the nozzle 12, as by brushing with a stirring rod, spoon, or the like, and no further measuring will be needed.

In the event that the desired dispensed quantity of extruded material exceeds the length of the ruler scale 13, I provide a protective cup member 17 that may also be used for measuring purposes. The cup 17 may be of transparent or translucent molded plastic construction and is preferably frictionally engageable with the outer rim of the tube end 11. The cup 17 may be inscribed with depth markings, which preferably begin (as shown in Fig. 1) at a point above the bottom of the cup. In the use of my cup, water (or other fluid in which the extruded material is to be dissolved) is first poured into the cup 17 up to the level indicated by the zero mark, and the material in the tube 10 is then extruded into the cup 17 until the fluid level reaches the desired weight or volume indication. Again the inscriptions on the cup preferably are in weight or volume units particularly adapted to the material being dispensed.

In Fig. 5 I show a modified arrangement according to the invention, and in this modification my measuring device may be applied to any tube 20, regardless of tube size. In the arrangement of Fig. 5, adapter means 21 includes a through passage 22 with a threaded end 23 to engage the threaded nozzle of the tube 20; the other end of the passage 22 may be capped by a ruler closure member 24 generally similar to the device of Fig. 2. The outer periphery of the adapter means 21 may be suitably formed to engage and to retain a protective cover and measuring cup 25 similar to the cup 17 of Fig. 1. Once the adapter means 21 has been applied to a particular tube 20, it may be kept in such position until the tube has been exhausted. The adapter may then be removed and saved for use with another tube.

In Fig. 6, I show a further modification of the arrangement of Fig. 1 in which a ruler scale 26 is formed with a nozzle closure device 27 at one end thereof, and in which a stud 28 on the top 29 of a squeezable tube receives the closure portion 27 for mounting the same adjacent the dispensing opening 30 of the tube.

It will be seen that I have described relatively simple arrangements for accurately measuring specific quantities of dispensed extrudable material. These measuring devices may serve as closure members for the dispensing means, and they may incorporate means for self support when used as measuring means. In the use of a ruler cap such as that shown in Fig. 2, it will be appreciated that the bracket portion 15 thereof may be relatively thin, so that, when mounted as in Fig. 3, a sufficient portion of the nozzle 12 may project to receive a standard cap 31 (see Fig. 3), thereby obviating the need for mounting and dismounting the ruler with each use of the tube.

It will be appreciated that dispensing means as described above may be particularly useful to pharmacists and to home photographers doing their own developing work. For the latter type of market, developing or other chemicals may be prepared as concentrated jellies or pastes and packaged in squeezable tubes (such as the tubes 10 and 20) impervious to light. Chemicals thus prepared and packaged may have an adequate shelf-life so as not to be subject to spoilage, for, as the chemicals are dispensed, the tube is collapsed and no air is entrained so as to make possible any oxidation of the remaining material in the tube. The material should, therefore, last well regardless of the amount of material that has been consumed from the tube.

While I have described my invention in detail for the preferred forms shown, it will be understood that modifications may be made within the scope of the invention as defined in the appended claims.

I claim:
1. A cap for closing the opening of a squeezable tube, comprising cover means to close said opening, a longitudinally projecting graduated scale on said cover means, and an offset bracket for attachment to said tube.

2. A cap for attachment to the threaded outlet opening of a squeezable tube, comprising internally threaded cover means with a longitudinally projecting graduated scale formed integrally therewith and with offset bracket means including threaded means for attachment to the threaded opening of the tube, whereby when said bracket means is attached to said tube and said tube is inverted, the quantity of material squeezed from said tube may be observed alongside said scale.

3. In combination, an adapter having a longitudinally extending through passage for attachment at one end to the nozzle of a dispensing device, cap means for covering the other end of said passage, a cup removably secured to said adapter, said cup being inscribed with depth-scale markings, and a longitudinally projecting graduated scale on said cap means and including offset bracket means for attachment to said other end of said adapter, whereby the scale on said cap may be utilized to measure relatively small quantities of extruded material and whereby said cup may be utilized in the measurement of relatively large quantities of said material.

4. A device according to claim 3, in which said markings begin at zero at a point above the bottom of said cup, and in which said markings progress increasingly toward the open end of said cup.

5. In combination, a squeezable tube including a dispensing nozzle at one end thereof, cover means for said nozzle, said cover means including a longitudinally projecting graduated scale, and means on said tube offset from and adjacent to said nozzle for supporting said cover means when said cover means has been removed from said nozzle.

JORGEN VIBE KIERULFF.

REFERENCES CITED

The following references are of record in the file of this patent:

UNITED STATES PATENTS

| Number | Name | Date |
| --- | --- | --- |
| 1,466,043 | Graham | Aug. 28, 1923 |
| 2,017,254 | Mulford | Oct. 15, 1935 |
| 2,372,278 | Jess | Mar. 27, 1945 |